No. 850,175. PATENTED APR. 16, 1907.
M. A. NEELAND.
GAS ENGINE VALVE GEAR.
APPLICATION FILED AUG. 3, 1904.

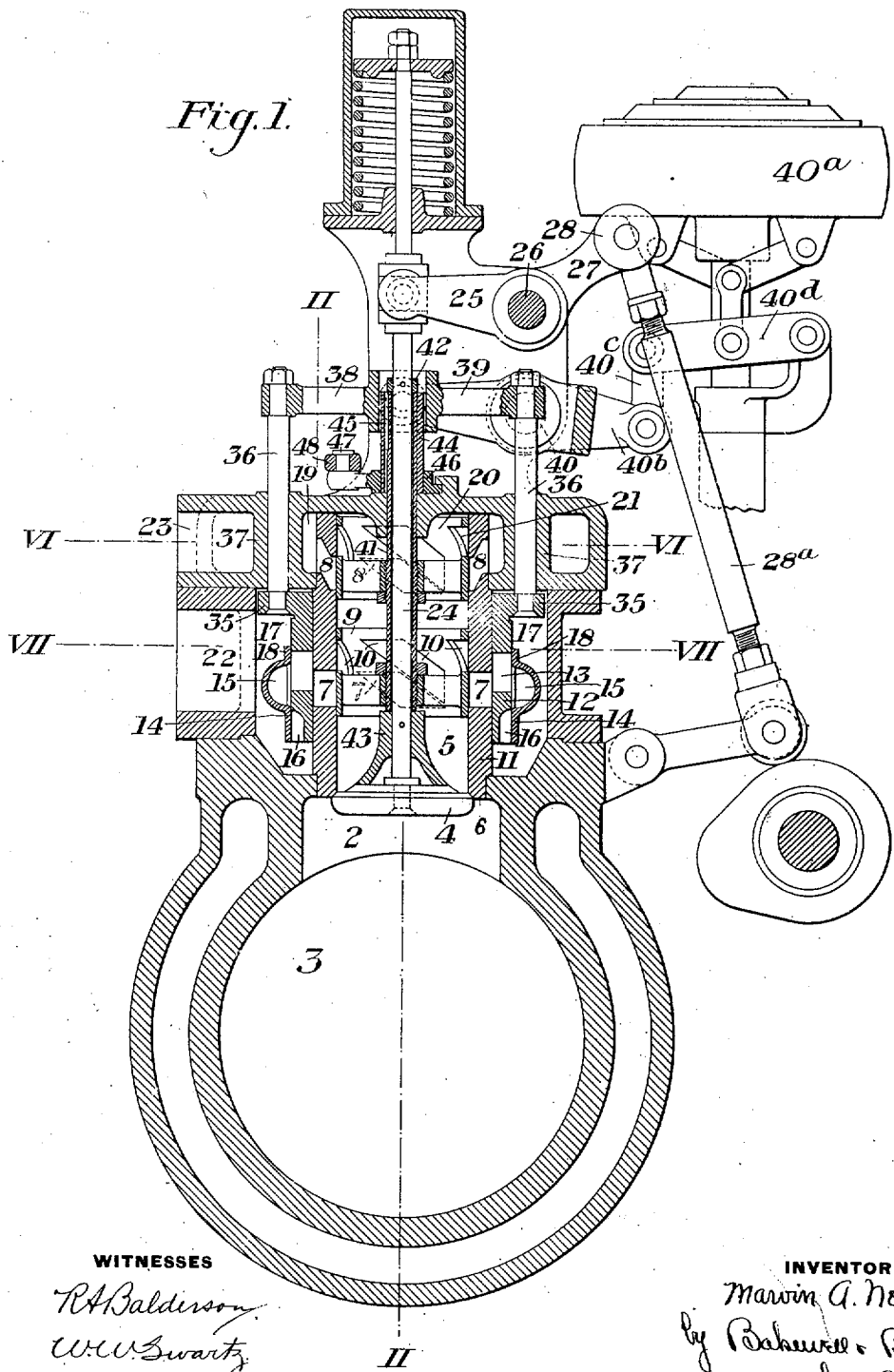

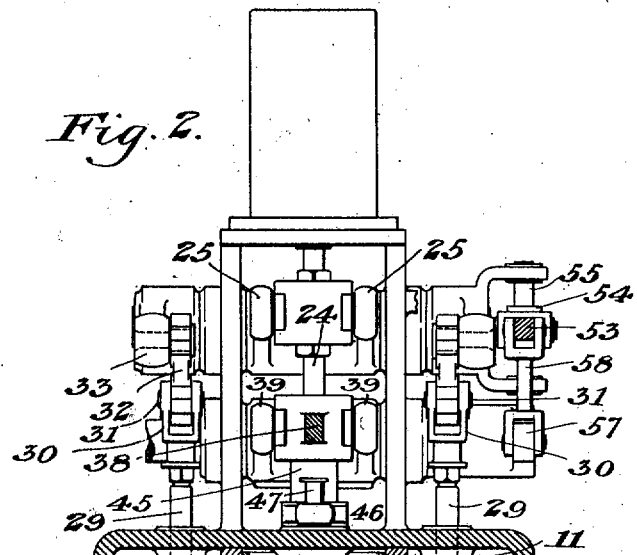
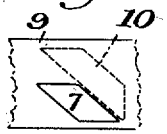
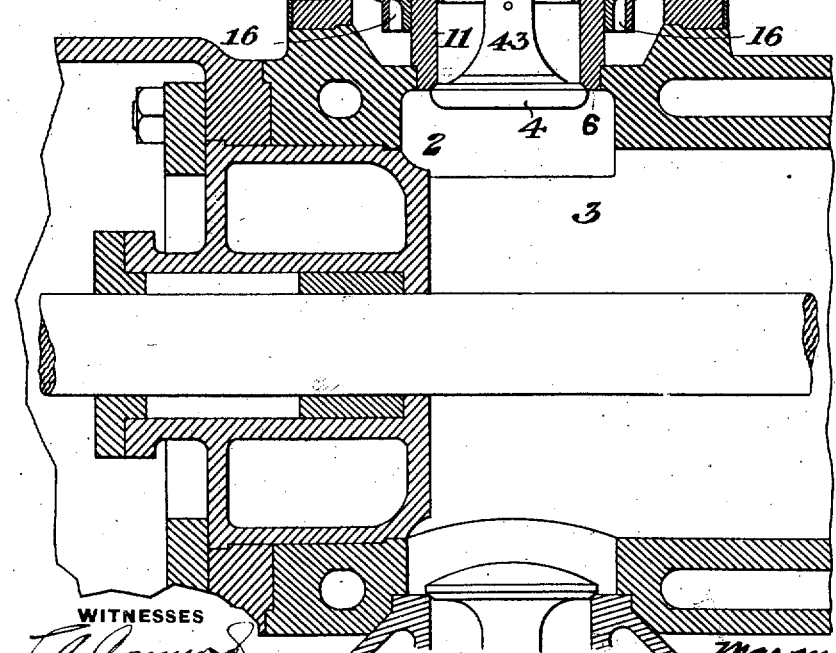

4 SHEETS—SHEET 3.

WITNESSES

INVENTOR
Marvin A. Neeland

No. 850,175. PATENTED APR. 16, 1907.
M. A. NEELAND.
GAS ENGINE VALVE GEAR.
APPLICATION FILED AUG. 3, 1904.
4 SHEETS—SHEET 4.
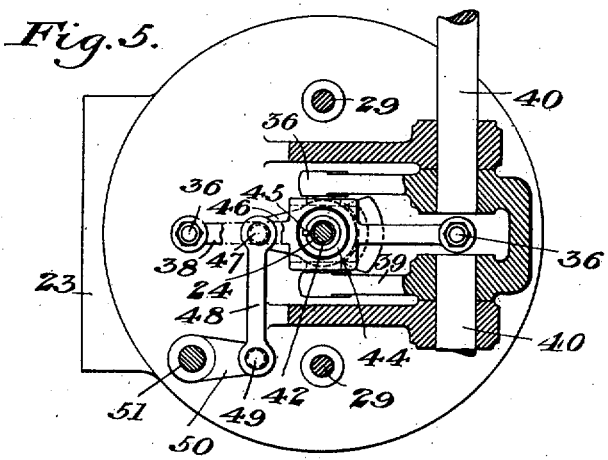
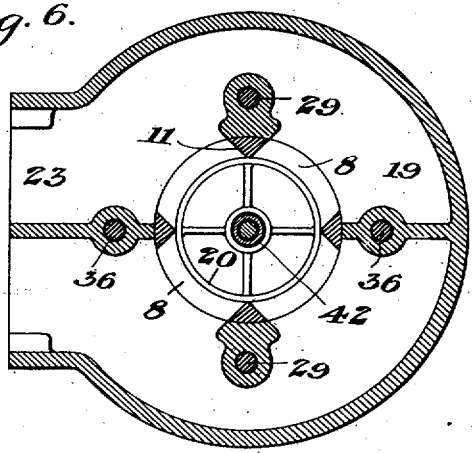
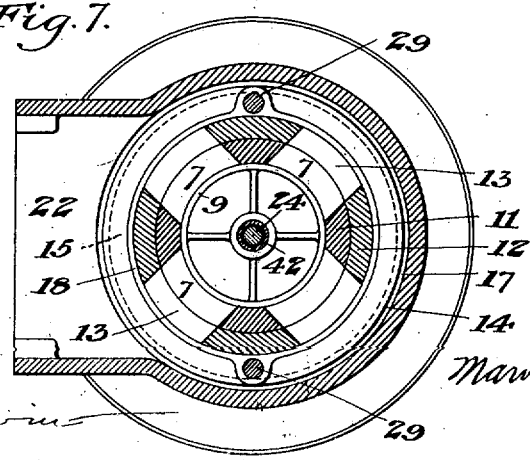
WITNESSES
INVENTOR
Marvin A. Neeland

UNITED STATES PATENT OFFICE.

MARVIN A. NEELAND, OF YOUNGSTOWN, OHIO.

GAS-ENGINE VALVE-GEAR.

No. 850,175.

Specification of Letters Patent.

Patented April 16, 1907.

Application filed August 3, 1904. Serial No. 219,272.

*To all whom it may concern:*

Be it known that I, MARVIN A. NEELAND, of Youngstown, Mahoning county, Ohio, have invented a new and useful Gas-Engine Valve-Gear, of which the following is a full, clear, and exact description, reference being had to the accompanying drawings, forming part of this specification, in which—

Figure 3:
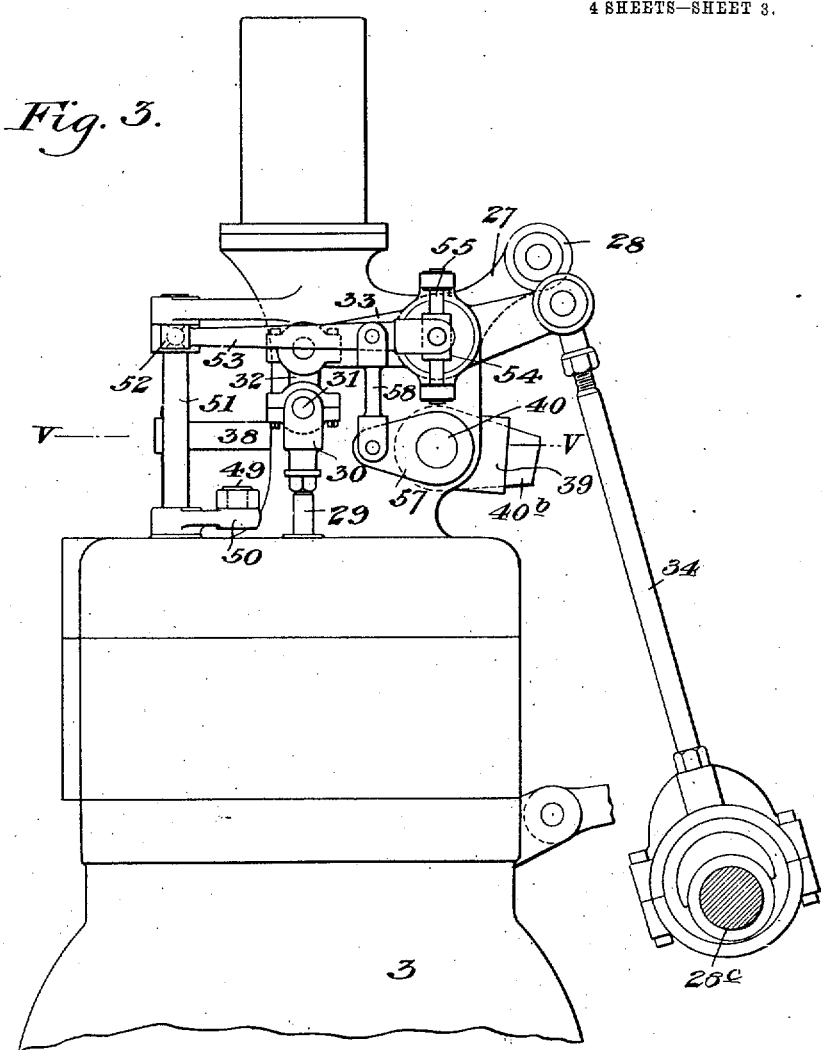
Figure 4:
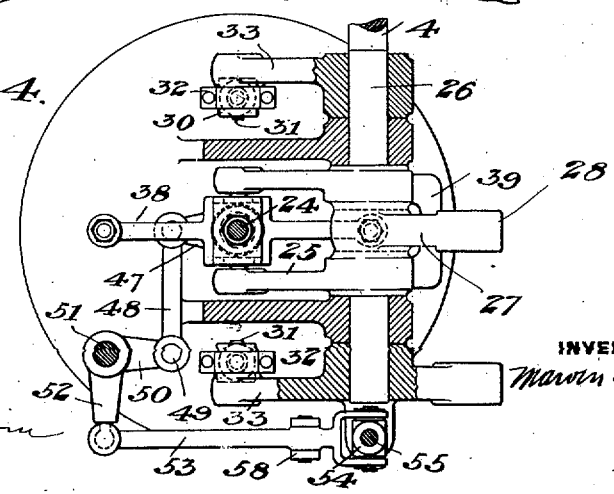

Figure 1 is a sectional end view of the cylinder and valve-gear of a gas-engine embodying my invention. Fig. 2 is a vertical section on the line II II of Fig. 1. Fig. 3 is an end elevation of the parts shown in Fig. 1 with some of the actuating connections omitted. Fig. 4 is a top plan view, partly in section. Fig. 5 is a horizontal section on the line V V of Fig. 3. Fig. 6 is a horizontal section on the line VI VI of Fig. 1. Fig. 7 is a similar view on the line VII VII of Fig. 1, and Fig. 8 is a detail of the parts in the walls of the mixing-chamber.

My invention relates to the class of gas or explosive engines, and is designed, first, to produce a non-tripping or non-releasing valve mechanism by which the gas or combustible is admitted at varying points in the piston-stroke under the control of the governor, and, second, to provide improved means for varying the total volume at a given pressure of air and gas admitted to the cylinder. These features may be used independently of each other or together, as I have shown them, and they may be employed either upon a single-acting or a double-acting engine.

As to the first feature, I use in conjunction with the main inlet-valve two or more gas-controlling valves which coöperate to control the flow of gas into the mixing-chamber, one of said valves being under the control of the governor. In the construction which I show three valves are used for this purpose; but two of these valves may be used without the third.

As to the second feature of varying the weight or volume at a certain pressure of the mixture which is admitted, I cut off the mixture at varying points in the stroke, the changes in the point of cut-off being gradual and not step by step. It has heretofore been proposed to throttle the mixture and also to cut off in a step-by-step manner; but I consider myself the first to cut off and vary such cut-off gradually. I also vary the quantity of mixture in combination with means for varying the time of admission of the gas to the power-cylinder.

Referring now to the drawings, I will first describe the first feature of my invention—namely, the means for varying the point of admission of the gas or combustible.

In the drawings, 2 represents the admission-port leading into the cylinder 3. 4 is the main inlet-valve from the mixing-chamber 5 into the cylinder. This valve seats outwardly against the circular seat 6, formed on the walls of the mixing-chamber. This mixing-chamber is provided with two annular sets of ports, the ports 7 being the gas-inlet ports to the mixing-chamber 5 and the ports 8 being the air-inlet ports to the mixing-chamber. Within the mixing-chamber is the cylindrical valve 9, having inclined slotted ports 10 around its circumference. Around the cage 11, which forms the wall of the mixing-chamber, slides the annular valve or valve-seat 12, having slotted ports 13 arranged to register with the ports 7 in the cage. The outer surface of the valve or seat 12 forms a seat for a gas-valve 14, which is preferably double-ported in order to provide a large inlet area. In the form shown the valve is an annulus with an inner annular channel 15, the valve 12 having ports 16, which are connected to the ports 13 through the channel 15 at certain times in the movement of the parts. The ports 13 are also connected directly to the annular gas-chamber 17 around the cage by the uncovering of the ends of these ports by the portion 18 of the valve 14.

The air-ports 8, which lead from the annular air-chamber 19, are controlled by the inner cylindrical air-valve 20, having an annular row of inclined ports 21 of similar shape to the ports 10 of the gas-valve 9. The ports 7 and 8 are also inclined in a manner similar to the ports 10 and 21. The gas is supplied to the air-chamber 17 through any suitable pipe 22, and air flows into the air-chamber 19 through the inlet-port 23. The valve 4 is secured to a stem 24, the rear end of which is pivoted to a two-armed lever 25, fulcrumed on shaft 26, the other arm 27 having a pivotal connection 28, with a rod 28$^a$ extending to a cam 28$^b$ on the counter-shaft 28$^c$ of the engine, this counter-shaft being driven at one-half the speed of the main shaft.

The sliding-valve mechanism which controls the ports 7 and 8 is preferably arranged to admit a constant proportion of gas and air at every position. In the engine shown, which is designed for a four-cycle engine, this valve moves out from and back to its seat during the suction-stroke. The flow of gas from the gas-chamber 17 in through the ports 13 is controlled by the valve 14, and this valve is moved by the valve-rods 29, which lead through the end wall of the gas-chamber and are provided with forked ends 30 and a cross-pin 31. The pins 31 are connected by pivotal links 32 with rock-arms 33, secured to the shaft 26. One of the arms 33 is extended and pivotally connected to the eccentric-rod 34, which stands upon the eccentric on the two-to-one counter-shaft of the engine. This connection moves the valve 14 down through the suction-stroke and back through the compression-stroke.

The gas-valve or valve-seat 12 is provided with lateral lugs 35, to which are secured rods 36, which extend through the end wall of the gas-chamber and through hubs 37 in the air-chamber to an external cross-head 38, having a hollow hub pivotally connected by rock-arms 39, secured to a rock-shaft 40, which is connected to and controlled by the governor 40$^a$, as by means of the arm 40$^b$, link 40$^c$, and lever 40$^d$, Fig. 1.

The valves 9 and 20 are both secured to a hollow shaft 41, which extends outwardly around the rod 24 and is held to the rod so as to reciprocate with it by means of end collars 42 and 43, secured to the rod 24. The gas and air valves 9 and 20 therefore reciprocate with the main inlet-valve. They are allowed to rotate around the stem 24 for a purpose to be later described, but reciprocate with the main inlet-valve.

Describing now the operation of the valves so far as they relate to varying the point of admission of the gas and beginning with the beginning of the suction-stroke, as the piston starts to move out through this stroke the valve 4 is opened, and at the same time the valves 9 and 20 are opened, admitting air to the mixing-chamber. As the piston starts on the suction-stroke or slightly before this movement the valve 14 starts to move toward its open position. This allows the gas to flow through the ports 16 and channel 15 and also directly past the end 18 of valve 14 through the ports 13 and ports 7 through the suction-stroke or a part thereof. If the engine is under full load, the governor will hold the valve or valve-seat 12 in a position which will allow the gas to enter at the beginning of the suction-stroke. If, however, the engine is running under partial load, the governor will have moved the valve 12 to a position which will admit the gas later in the stroke. This position of the valve 12 will be nearer the main inlet-valve or toward the bottom of Fig. 1, so that the valve 14 on its inward movement will not open the ports 13 until after the suction-piston has moved a certain distance in the suction-stroke. At all times, however, air is admitted at the beginning of the suction-stroke and will flow into the cylinder and fill the space therein until gas is admitted to the mixing-chamber. From that point on through the suction-stroke, provided the valves 9 and 20 are not controlled in the manner hereinafter described, a mixture will flow into the cylinder, thus giving the well-known stratification, with the mixture following the air, and consequently in proper position for ignition. At the end of the suction-stroke the main inlet-valve 4 is closed, and simultaneously the valves 9 and 20 are closed, thus shutting off the supply of gas and air from the mixing-chamber and simultaneously closing the inlets 7 and 8 to the mixing-chamber. At this time the ports 13 are still open, and when the engine is under partial load and the valve 14 is moved back to its normal position through the compression-stroke the ignition takes place at the end of the compression-stroke and the valves remain in their normal position through the explosion and exhaust strokes, the exhaust passing out through a suitable exhaust valve or valves. It will therefore be clear that the movement of the valve 12, which is controlled by the governor, determines the time at which the gas is allowed to flow in, but has no action as to the time when the gas is cut off, this time being governed by the movement of the valve 9, which moves with the valve 4. I therefore by using the plurality of valves which coöperate in controlling the flow of gas can change the point of admission without changing the point of cutting off the admission correspondingly, since these two features are controlled separately, one valve being moved by the governor, while the other valve moves with the inlet. I can therefore vary the point of admission of the gas to any point through the suction-stroke of the piston and can cut off the admission at any desired point independently of the point at which the admission begins.

I will now describe the construction by which I vary the weight or volume under a given pressure of the inflowing gas and air.

The valves 9 and 20, while secured to the sleeve 41, are allowed to rotate by turning a thin sleeve around the stem 24. This turning movement is imparted by an outer sleeve 44, which has a sliding keyway connection 45 with the tube 41, the sleeve 44 having an arm 46 secured thereto. The arm 46 is provided with a pin 47, connected by a link 48 to a pin 49, projecting from a rock-arm 50 to a rock-shaft 51, having a lever 52 connected to a link 53. The link 53 is pivotally connected to a sleeve 54, arranged to slide loosely along a shaft 55. The shaft 55 is secured to the end of shaft 26, the axis of shaft 26 passing through the pivotal center of the sleeve 54 when the sleeve is in its central position. The shaft 55 has its ends secured to lugs secured to an arm keyed to the shaft 26. When the sleeve is at the center of the shaft 55, the rocking of the shaft 26 will not actuate the link 53; but if the sleeve 54 is moved to one side of the center in rocking the shaft 26 will turn the valves 9 and 20. The position of the sleeve 54 is controlled by the governor, and for this purpose the governor-shaft 40 is provided with a rock-arm 57, pivotally connected by link 58 with the link 53. As the governor shifts its position it rocks the shaft 56, and thereby shifts the position of sleeve 54, the lever 53 rocking on its connection to the rock-arm 52. It will therefore be clear that the governor will control the angular position of the valves 9 and 20 around the axis of these valves, and thereby control the point of cut-off of the gas and air. If the engine is under full load, the position of the valves is arranged so that they will cut off the mixture at the desired point in the stroke for such load. I prefer to make this about seventy-five to eighty per cent. of the total volume of the cylinder—that is, under full load the valves 9 and 20 will cut off the mixture after the piston has moved through seventy-five or eighty per cent. of its suction-stroke. Under reduced load the governor will turn the valves 9 and 20 over the ports 7 and 8, and thereby cause the reciprocation of the valves 9 and 20 to cut off the mixture at a later point in the suction-stroke. The point of cut-off is therefore controlled by the governor, which in the form shown also controls the point of admission of the gas, as above described. By cutting off the mixture later in the stroke a greater compression is obtained, which is desirable where more air is admitted under lighter loads. The governor in the form shown therefore performs the double function of controlling the point of admission of the gas and the point of cut-off of the gas and air. Under full load the gas will be admitted, preferably, at the beginning of the suction-stroke, and the gas and air will be cut off at the desired point, preferably seventy-five or eighty per cent. of the stroke. As the load decreases the gas will be admitted later in the suction-stroke, and the gas and air will be cut off later in the stroke, thus giving a greater compression where more air is admitted, the air being continuously admitted up to the time of cutting off in all cases. The increase in the amount of air admitted is greater than the decrease in the amount of gas admitted, thereby causing greater compression under reduced loads. I therefore obtain the double advantage of maintaining the mixture approximately constant in proportions of air and gas and also of increased compression at reduced loads to compensate for any dilution of this mixture through the compression-stroke where the greater amount of air is added before the mixture of gas and air is introduced. Where the gas is admitted later in the stroke, there being more air present in the cylinder than under full load, I compensate for the partial mixing of this increased air with the mixture by getting a greater compression of the mixture, it being well known that the leaner a mixture is the greater should be the compression. I thus overcome the objection to stratification which has heretofore existed,—that is, where air has been introduced before the gas and air under reduced loads a partial mixing of the air would make the mixture leaner. I thus obtain a more perfect combustion of the mixture throughout the range of loads.

The advantages of my invention are above shown and will be obvious to those skilled in the art.

The two main features of my invention may be used independently of each other—that is, one may be used without the other—and I intend to cover them separately in my claims. I prefer, however, to use them together, since they coöperate, as above described, and I consider myself the first to combine those features.

Many changes may be made in the form and arrangement of the valves and their actuating connections without departing from my invention.

I claim—

1. In an explosive-engine, a mixing-chamber, a gas-inlet port leading to the chamber, and compound valve means for controlling the gas-inlet port, one member of said valve being arranged to control the time of gas admission to the mixing-chamber, and another member being arranged to control the time of cutting off the gas-supply through said port, and actuating connections for the valve means whereby the point of admission may be changed without changing the point of cut-off; substantially as described.

2. In an explosive-engine, a mixing-chamber, a gas-inlet port leading to the chamber, valve means for controlling the time of admission of gas to the chamber, other valve means for controlling the time of cut-off of gas and air to the chamber, and governor connections for operating the valve means, whereby as the load on the engine decreases gas will be admitted and cut off later in the suction-stroke; substantially as described.

3. In an explosive-engine, a mixing-chamber, an inlet-port between the mixing-chamber and the explosive-chamber, a valve controlling said port, said mixing-chamber having a gas-inlet port, a compound valve controlling said port, one member of said valve being controlled by the engine-governor and controlling the point of admission, and another valve member being actuated with the inlet-port-controlling valve and determining the time of cut-off; substantially as described.

4. In an explosive-engine, a mixing-chamber, a gas-inlet port leading to the chamber, a plurality of valves controlling said port, one of said valves being arranged to control the time of inlet, and the other valve being arranged to control the time of shutting off the supply through said port; and connections for actuating said valves; substantially as described.

5. In an explosive-engine, an inlet-valve, a mixing-chamber, a gas-inlet port leading to the chamber, a plurality of valves controlling said port, one of said valves being arranged to control the time of inlet, and the other valve being arranged to control the time of shutting off the supply through said port, and connections for actuating said valves; substantially as described.

6. In an explosive-engine, an inlet-valve, a mixing-chamber, a gas-port leading into the mixing-chamber, an admission-valve for said port, a governor, connections between said valve and the governor, a cut-off valve for said port, and means for actuating the cut-off valve in synchronism with the cylinder-inlet valve, together with connections between the cut-off valve and the governor for changing the time of action of the cut-off valve without affecting the time of action of the admission-valve; substantially as described.

7. In an explosive-engine, a mixing-chamber having a gas-admission port, and three valves controlling said port, connections between one of said valves and the engine-governor arranged to vary the time of gas admission, and connections between another of said valves and the governor to vary the time of cut-off; substantially as described.

8. In an explosive-engine, an inlet-valve, a mixing-chamber, a port admitting combustible to the mixing-chamber, three valves controlling said port, a governor connected to one of said valves, another of said valves coöperating with the governor-connected valve to control the point of admission, and connections arranged to actuate the third valve to cut off the supply of combustible to the mixer; substantially as described.

9. In an explosive-engine, a main inlet-valve controlling the discharge from the mixer into the cylinder, and three valves controlling the mixer-ports, two of said valves controlling the gas-ports one of said valves being connected with the governor, the second valve coöperating therewith to control the time of admission of gas, and connections arranged to actuate the third valve to shut off the gas and air; substantially as described.

10. In an explosive-engine, a main inlet-valve controlling the discharge from the mixer into the cylinder, and three valves controlling the mixer-ports, one of said valves being connected with the governor, the second valve coöperating therewith to control the time of admission of gas, the third valve being connected to and movable with the main inlet-valve; substantially as described.

11. In an explosive-engine, a mixing-chamber having air and gas inlet-ports, a valve for controlling the inlet and also the cut-off at the air-port, a valve for controlling the admission at the gas-port, a separate valve for controlling the cut-off at the gas-port, governor connections for varying the time of action of the air-inlet-controlling valve, and governor connections for the gas-inlet and cut-off-controlling valves, whereby their time of action is varied; substantially as described.

12. In an explosive-engine, a mixing-chamber having air and gas inlet ports, valves for the said ports, means for reciprocating said valves over said ports, governor-actuated means for changing the relative positions of the valves and ports to vary the points of air and gas cut-off, and supplemental valve means controlled by the governor for varying the point of gas admission; substantially as described.

13. In an explosive-engine, a mixing-chamber having air and gas inlet ports, valves for the said ports, governor-actuated means for changing the relative positions of the valves and ports, and supplemental governor-controlled valve means for varying the point of gas admission independently of the air admission; substantially as described.

14. In an explosive-engine, a main inlet-valve, a mixing-chamber, gas and air ports leading into said mixing-chamber, and valves connected to the inlet-valve to move in unison therewith, and respectively over the gas and air ports, and a governor arranged to rotate the said valves with respect to their ports, together with a supplemental independently-controlled valve, for controlling the gas admission; substantially as described.

15. In an explosive-engine, a main inlet-valve, a mixing-chamber, gas and air ports leading into said chamber, valves fixed to the stem of the inlet-valve to reciprocate therewith, but capable of an angular movement on said stem, and a governor arranged to effect the angular movement of said valves to thereby change the point of cut-off, together with a gas-admission valve, and means for controlling the same independently of the other valves; substantially as described.

16. In an explosive-engine, a mixing-chamber having air and gas inlet ports, and a plurality of valves controlling the said ports, and actuating connections therefor, said valves, ports and actuating connections being arranged to vary the time of admission of gas to the mixing-chamber relatively to the time of air admission, and independently thereof and to cut off the air and gas from the mixing-chamber simultaneously and independently of the point of admission of the gas; substantially as described.

17. In an explosive-engine, a main inlet-port, a mixing-chamber having a gas-inlet port, a governor-actuated valve controlling the point of admission of gas to said chamber, and a separate valve, actuated in unison with the main inlet-valve, and controlling the time of cutting off the gas admission; substantially as described.

18. In an explosive-engine, a mixing-chamber having air and gas inlet ports, a valve controlling the admission and cut off of air to said chamber, a valve for cutting off the gas admission simultaneously with the air cut-off, and supplemental valve means for varying the time of gas admission independently of the time of air admission; substantially as described.

19. In an explosive-engine, a main inlet-valve, a mixing-chamber, having air and gas inlet ports, a valve arranged to admit air to the chamber at a predetermined point in the stroke, valve means for varying the time of gas admission independently of the time of air admission, and governor-controlled means for changing the volume of air and gas admitted to chamber; substantially as described.

20. In an explosive-engine, a mixing-chamber having gas and air inlet ports, valves within said chamber arranged to traverse the said ports, a valve member surrounding the mixing-chamber and having a port arranged to be moved into register with the gas-inlet port, connections between the valve member and the engine-governor, and a gas-admission valve seated on the last-named valve, and means for actuating the gas-admission valve independently of the other valves; substantially as described.

21. In an explosive-engine, a mixing-chamber having inclined air and gas inlet-ports, circular valves having correspondingly-inclined ports, means for reciprocating said valves over the said ports, and a governor arranged to effect a gradual change in the position of the valves to thereby gradually vary the volume of mixture admitted to the cylinder with a corresponding variation in compression; substantially as described.

22. In an explosive-engine, a mixing-chamber having air and gas inlet ports, valves for said ports, a governor for changing the relative positions of the valves and ports to vary the volume of mixture in said chamber with a corresponding variation in cylinder compression, and supplemental valve means for varying the time of gas admission independently of the time of air admission; substantially as described.

23. In a gas-engine, a gas-admission valve, a gas-cut-off valve, a movable ported seat for the gas admission valve, means controlled by a moving part of the engine for moving the valve relatively to its seat, and governor-controlled means for shifting the seat relatively to the valve; substantially as described.

24. In a gas-engine, the combination of a cylinder, a mixing-chamber having air and gas inlets, governor-controlled valve means for controlling the air admission and cut-off and the gas cut-off, and independent governor-controlled auxiliary valve means for varying the point of gas admission; substantially as described.

25. In an explosive-engine, a mixing-chamber having air and gas inlet ports, and a plurality of valves controlling said ports, together with actuating and governing means for said valves, whereby the time of admission of gas to the mixing-chamber is automatically controlled independently of the time of air admission, and the air and gas are simultaneously cut off independently of the point of admission of the gas; substantially as described.

In testimony whereof I have hereunto set my hand.

MARVIN A. NEELAND.

Witnesses:
L. A. CONNER, Jr.,
H. M. CORWIN.